H. McGRAW.

Lubricators.

No. 6,202. Reissued Jan. 5, 1875.

Witnesses
R. R. Dyer
Chas. Thurman

Inventor
Henry McGraw.
by Geo. W. Dyer & Co
Attys

THE GRAPHIC CO. PHOTO-LITH. 39 & 41 PARK PLACE, N.Y.

UNITED STATES PATENT OFFICE.

HENRY McGRAW, OF DETROIT, MICHIGAN.

IMPROVEMENT IN LUBRICATORS.

Specification forming part of Letters Patent No. 134,436, dated December 31, 1872; reissue No. 6,202, dated January 5, 1875; application filed January 10, 1874.

*To all whom it may concern:*

Be it known that I, HENRY McGRAW, of Detroit, in the county of Wayne and State of Michigan, have invented a new and useful Improvement in Oil-Cups; and I do declare that the following is a true and accurate description thereof, reference being had to the accompanying drawings and to the letters of reference marked thereon, and being a part of this specification, in which—

Figure 1:
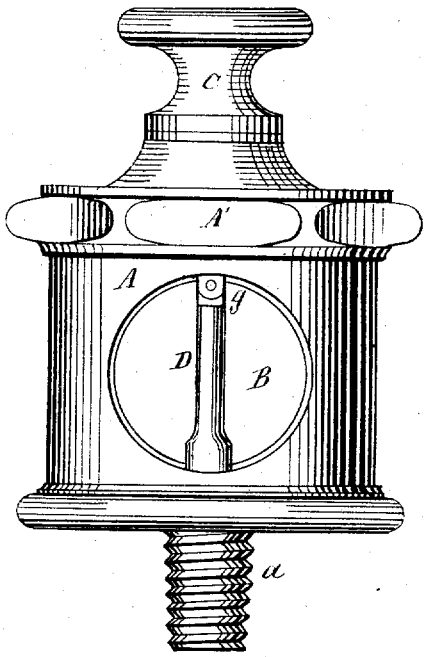
Figure 2:
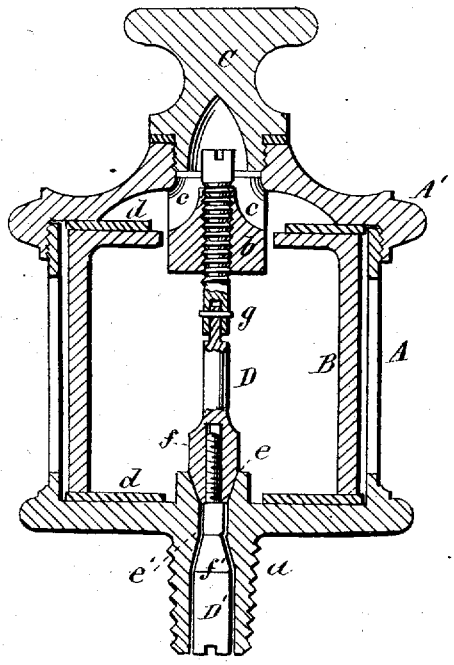
Figure 3:
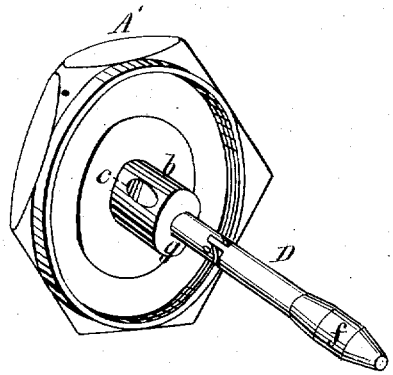

Figure 1 is an elevation of my oil-cup. Fig. 2 is a vertical section of the same. Fig. 3 is a detached perspective view of the jointed valve-stem and the cap.

Like letters refer to like parts in each figure.

This invention relates to an improvement in the construction of that class of oil-cups more especially designed to lubricate the moving parts of steam-engines, technically known as "engine oil-cups;" and has for its object, first, to afford more certain and reliable means of governing the flow of oil from the cup; and, secondly, to so construct the valve-stem that the vibration of the parts will prevent the material from clogging in the minute space between the valve and seat.

The invention consists in the peculiar construction of the metallic shell inclosing a glass oil-cup, the said shell having either a single or double valve-seat in the opening leading through its supporting-stem; in the peculiar valve-stem employed, having a loose joint in its upper part, which is threaded through a depression in the cap of the cup, whereby it may be regulated, and carrying at its lower end a valve closing against the upper seat; and, if desired, a second valve may be screwed to its lower end, to close upward against the lower seat, all arranged to operate substantially as more fully hereinafter set forth.

In the drawing, A represents a metallic cylindrical shell, having a number of circular openings in its sides, and with a hollow screw-stem, *a*, projecting from its base, to screw into the cap or top of the bearing to be lubricated. A′ is a cap, which is screwed onto the cup A, and is formed with an internal pendent boss, *b*, above which there is a depression in the cap, through which there are drilled two lateral passages, *c*. The depression is closed by a screw-plug, C. By removing the plug the cup may be filled. By pouring the oil into the depression it will flow through the passages into the body of the cup, which contains a glass cylinder, B, which is packed by a suitable washer, *d*, at top and bottom. In the top of the passage, through the stem *a*, there is formed a valve-seat, *e*, and lower down in the passage there may be formed a second valve-seat, *e′*, from which a valve would open downwardly, and below which seat the passage is enlarged. D is the main valve-stem, which is in two parts, hinged or jointed together, as at *g*, the upper part being a screw, the upper end of the stem being slotted to receive a screw-driver, by which it may be turned up or down. *f* is a valve which is formed at the lower end of the stem to seat against the seat *e* when the stem is screwed down.

By raising the stem D more or less the oil contained in the cup will flow out through the passage in the stem *a*, and down to the journal to be lubricated, the volume of outflow being regulated as above described. As, ordinarily, the opening is gaged very finely, so as not to waste the lubricant, there is a tendency to clog the minute opening of the valve. This I prevent by jointing the stem, so that the stem and valve will be kept in constant vibration by the vibration and jar of the parts to which the cup is attached.

In certain cases, and especially where heavy natural oils are used, it is desirable to have the valves open downwardly; and to this end into the lower end of the main valve-stem I tap a hole, into which I screw the upper end of the supplementary valve-stem D′, whose lower part forms a valve, *f′*, which is seated at *e′* by screwing its stem up into the main stem. The lower end of the valve is slotted, so that it can be turned by a screw-driver to adjust it to give the required outflow, the upper valve being, of course, opened away from its seat. This second valve is not essential to the working of the cup, but it is an advantageous addition, whose cost is trifling, giving the engineer his choice between the upward and downward closing valves.

What I claim as my invention, and desire to secure by Letters Patent, is—

1. In an oil-cup, the combination of a jointed or hinged valve-stem having a valve, and a valve-seat, constructed and arranged that the valve may have a vibratory movement in the seat, substantially as and for the purpose described.

2. In combination with said jointed valve-stem D, the supplementary stem D′ and valve *f′*, with relation to the seat *e′* in the outflow of an oil-cup, substantially as and for the purposes described.

3. The combination of the shell A, cap A′, glass cup B, plug C, stem *a*, boss *b*, washers *d d*, valve-seat *e*, jointed valve-stem D, and valve *f*, as shown and described, for the purposes specified.

4. The combination of the shell A, cap A′, glass cup B, plug C, stem *a*, boss *b*, washers *d d*, valve-seats *e e′*, jointed valve-stem D, supplementary valve-stem D′, and valves *f f′*, as shown and described, substantially as and for the purposes set forth.

HENRY McGRAW.

Witnesses:
CHAS. E. HUESTIS,
CHARLES J. HUNT.